Nov. 15, 1932.   S. C. FINGER   1,887,627
METHOD AND MEANS OF FABRICATING STRUCTURES
OF METAL AND NONMETALLIC MATERIALS
Filed May 26, 1931   2 Sheets-Sheet 1
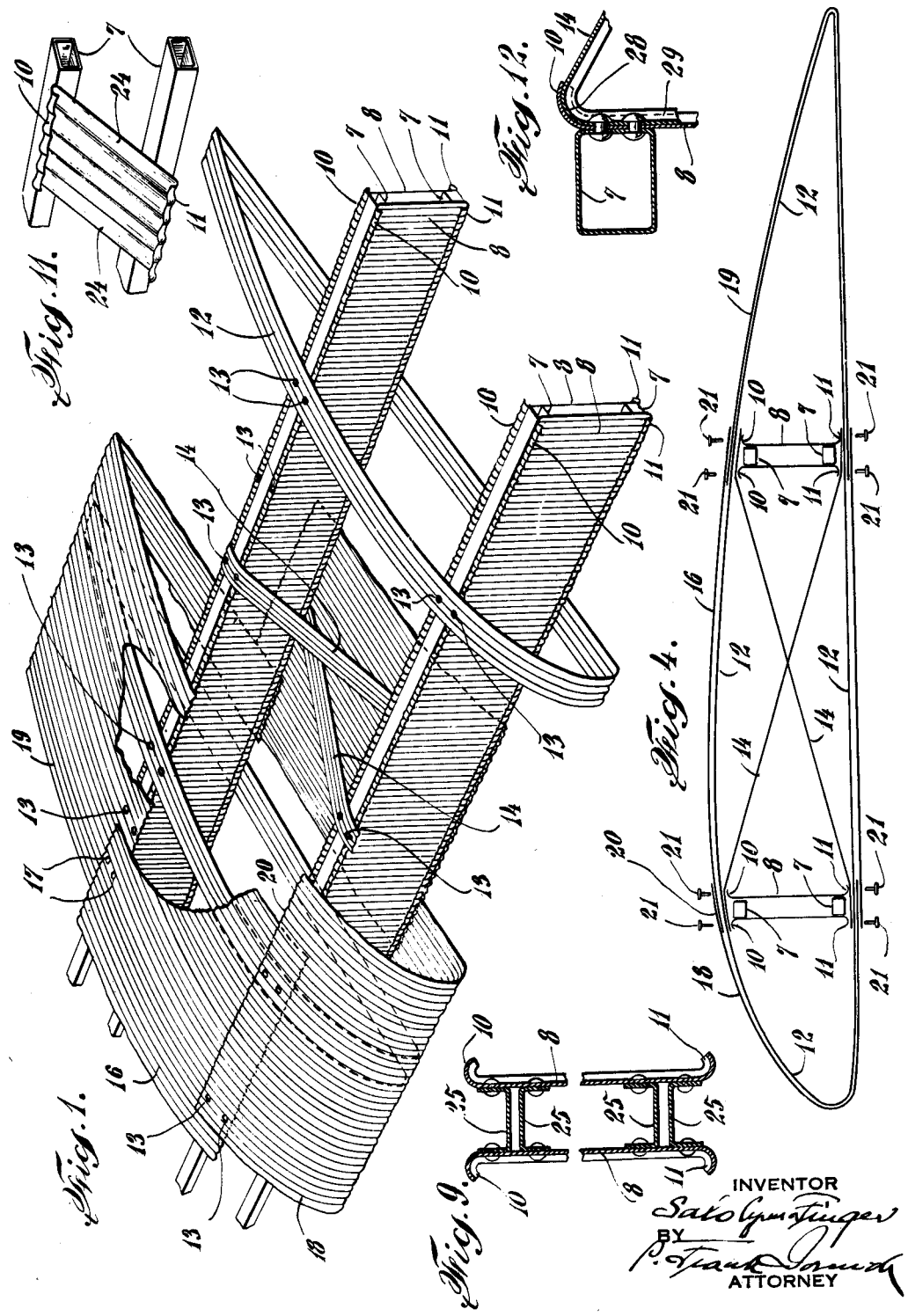

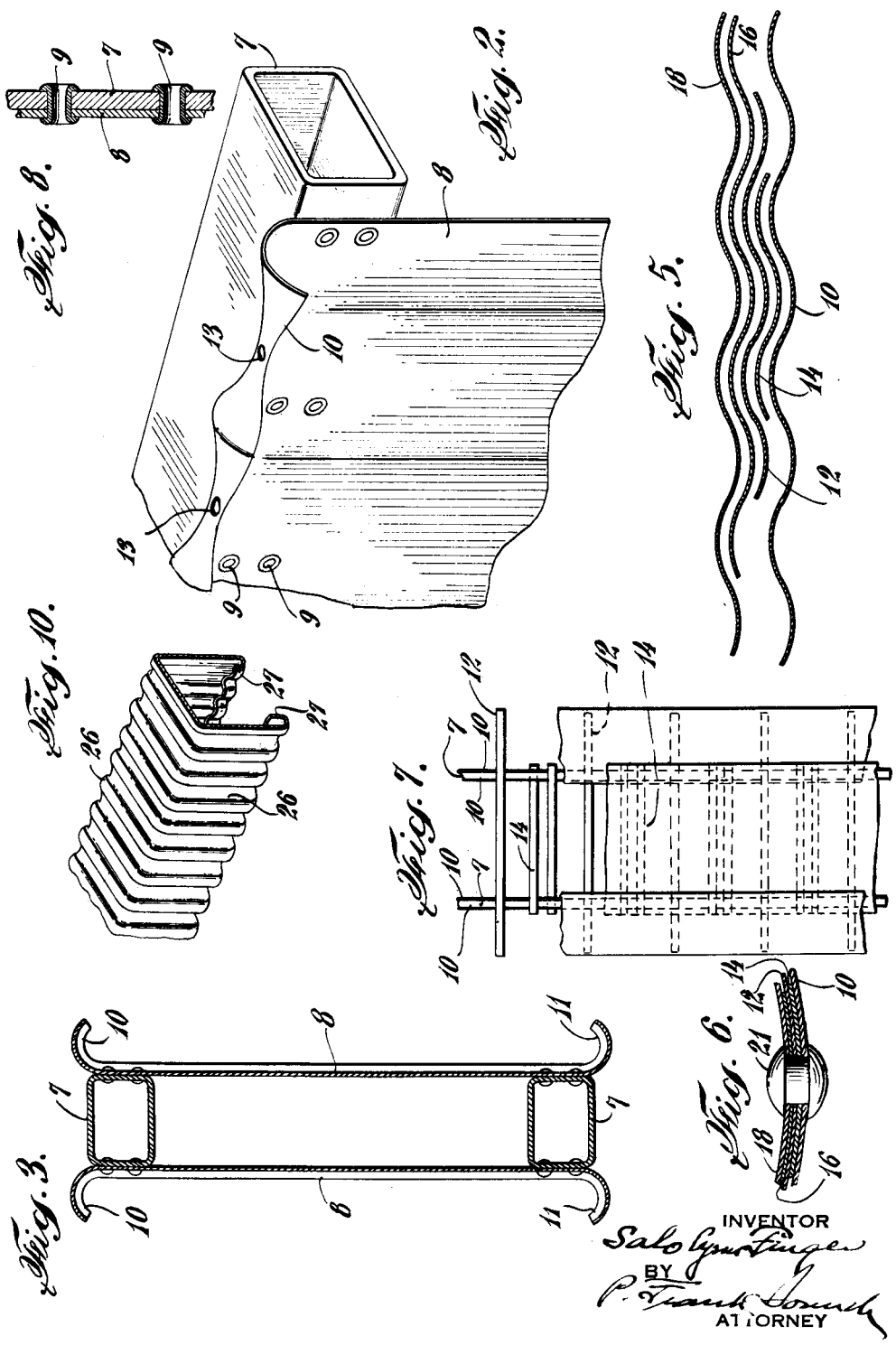

Patented Nov. 15, 1932

1,887,627

UNITED STATES PATENT OFFICE

SALO CYRUS FINGER, OF FAR ROCKAWAY, NEW YORK

METHOD AND MEANS OF FABRICATING STRUCTURES OF METAL AND NONMETALLIC MATERIALS

Application filed May 26, 1931. Serial No. 540,104.

This invention relates generally to methods and means of fabricating metallic structures and structural elements, having a wide range of utility in the production of airplane components as the wings and fuselage thereof, in airship construction, as well as in the building of motor vehicles and various types of marine craft, including aircraft flotation media and the like, and in the construction or erection of portable and other buildings for various purposes.

More specifically, my invention is directed to an assembled metallic structural unit having a wide range of application, as aforesaid, and a method of utilizing such structural unit in cooperation with other elements to form a complete metallic structure that will embody characteristics, which, heretofore, have been unattainable in metallic structures of generally corresponding types for similar purposes, the structural unit also possessing many advantages in the fabrication or erection of structures which are not of an all-metal composition.

While, as pointed out, my invention has various uses in analagous and non-analagous arts, for the purposes of this disclosure I have elected to show and describe it, as it may be practiced in the production of an airplane wing in which the advantages which flow therefrom may be especially emphasized in comparison with prior structures of the kind. It will be understood, however, that this election is made for illustrative purposes only, and does not, in any way, constitute a limitation of the scope of my invention to this particular use.

As is well known, many types of airplane wings are of all-metal construction, while others are composed of wood and metal, wood and fabric, or metal and fabric, the wing, irrespective of its specific composition, embodying so-called front and rear spars or beams which are maintained in laterally spaced relationship by chord members or ribs, with suitable wire, or other form of bracing disposed between the spars in various ways. Upon this framework the skin or covering is applied in any suitable manner, depending largely upon the characteristics of the material used for this purpose. The wing, when functioning, is subjected to severe torsional strains and stresses and bending loads which, as it is now constructed, irrespective of the composition of its constituent elements, must be entirely resisted by the framework, the skin or sheathing, insofar as its contribution to the strength of the wing is concerned, being virtually a parasitic part of the wing structure. Therefore, in accordance with standard practice, when an airplane wing is designed, provision must be made for the framework to resist within itself those stresses and loads to which the wing as a component of the airplane is ordinarily subjected in use. While it is essential that the framework of the wing be of a strong construction, it is also necessary that the wing, as a whole, be of light weight, and in attempts to attain an efficient wing having these two vital and basic characteristics, designers have resorted to the use of various forms of metal and wood framework construction. In many instances such constructions call for the use of elements requiring special production processes which not only increase material costs but make assembly operations complicated and expensive. On the other hand, where attempts have been made to meet economic demands, by utilizing standard material in the production of the wing, the results have been far from satisfactory because of the difficulties of obtaining the requisite strength in a light-weight structure.

From the foregoing, it will be manifest that, at the present time, no simple and dependable method of producing an airplane wing that will possess those structural characteristics which are recognized as essential, and at the same time respond to the requirements for economical production, is available.

Therefore, it is an important object of this invention to provide a method and means, whereby an airplane wing may be produced that will be lighter in weight than a wing of the same dimensions and airfoil section or curvature, constructed according to present standards, without sacrificing, in any degree, the important attribute of strength, the wing, produced by the use of my invention, in fact, possessing a higher strength factor than its counterpart of existing standard construction.

Further, and more generally, it is the object of this invention to provide a fabricated structural metallic element which is so designed that it may be readily combined with other metallic and non-metallic elements, in various forms of construction work, as hereinbefore set forth, with attendant economic and other advantages.

More specifically, it is an object of this invention to simplify and expedite the construction of airplane wings and other so-called sustaining surfaces, having an internal framework sheathed or covered with suitable material to complete said surface, wherein greater strength and rigidity for a given amount of material may be obtained, than is possible in existing methods of construction of such surfaces, thereby rendering it possible to utilize lighter material with a concomitant reduction in production costs.

Briefly stated, the application of my invention to the production of a sustaining surface, as an airplane wing, contemplates the utilization of a fabricated metallic structural unit, as aforesaid, with which suitable chord members are cooperatively associated in the production of a framework, conforming generally to those of conventional design, wherein the sheathing or skin, which is applied to the framework, becomes an important factor in contributing to the strength of the wing structure as a whole, my method of assembling of the various components of the wing being particularly advantageous in providing an all-metallic type of construction, not only structurally but by reason of reduced material and manufacturing costs.

Other objects and advantages flowing from the practicing of my invention will doubtless become apparent as the description proceeds, and I would have it clearly understood that I reserve unto myself all rights to the full range of equivalents, both in structure and in use to which I may be entitled under my invention in its broadest aspect.

In the accompanying drawings I have illustrated a specific embodiment of my invention, together with certain modifications of elements thereof, as it may be utilized in a particular application; that is, the production of an airplane wing. However, my invention may be otherwise used and the means whereby it is carried into effect may be varied in form in their relation, one to the other, as may be found necessary to attain the objectives to which it is directed, as herein set forth, without departing from the spirit and scope thereof, as defined by the appended claims.

In the accompanying drawings:

Figure 1 is a view in perspective, illustrating the application of my invention to the production of an airplane wing, or a sustaining surface, of an analagous construction.

Figure 2 is a perspective of a fragment of a fabricated metallic element, embodying my invention, which is utilized in providing front and rear spars for the construction shown in Figure 1.

Figure 3 is a transverse section, in elevation, of one of the spars shown in Figure 1.

Figure 4 is a view taken on the chord of an airplane wing produced in accordance with my invention, depicting the relationship of the cooperating components of the structure and the sequence of assembly.

Figure 5 is a disrupted view, illustrating, in superposed relationship, the supporting flanges of the spar and the elements of the wing structure that cooperate therewith.

Figure 6 is a sectional view, showing the manner in which the cooperating laminæ of the wing structure, illustrated in Figure 5, may be united or interlocked.

Figure 7 is a top plan view of a section of the wing shown in Figure 1.

Figure 8 is a sectional view, illustrating a preferred means for securing the web-forming sections of the structural unit, which functions as a spar, to the longitudinal members thereof.

Figure 9 is a modified form of spar in which the longitudinals are of a channel formation.

Figure 10 is a view in perspective, illustrating another form in which the longitudinal members of the structural element may be produced.

Figure 11 is a perspective of a further modification of the structural element, and Figure 12 is a view in cross-section of a fragment of a spar and a cooperating element of the wing framework associated therewith, in an alternative method of assembly.

Referring now to the drawings in detail in which like characters of reference are employed to designate similar parts in the several views, and more particularly to the structure shown in Figures 1 to 8, inclusive, the structural element which functions as a spar in the construction of an airplane wing comprises vertically-spaced longitudinals 7, preferably of a rectangular cross-section, which may be of any suitable material, such as duralumin, or the like. To the opposite sides of these longitudinals, I affix, as by hollow rivets 9, the web-forming members of the element or spar, of corrugated metal as shown at 8, the parallel webs extending from end to end of the longitudinals, with their corrugations disposed transversely thereof at an angle of 90° to the longitudinal axis of said element.

Of course, it will be manifest that the web-forming members may be fixed to the longitudinals of the spar-forming element by other types of rivets, or by bolting or any other means, which may be found practicable in the assembly of the structure.

As will be observed, each of the two laterally-spaced web portions of the spar, is bent or rolled outwardly along its parallel longitudinal edges, these offset integral extensions of the web sections providing sets or pairs of upper and lower flanges 10 and 11, which function as supporting surfaces for other elements of the wing structure, as will be hereinafter more fully explained.

An airplane wing, produced in accordance with my invention, similar to one of a conventional design, includes a framework, embodying front and rear spars with cooperating chord members corresponding in function to the ribs and fore and aft bracing devices of existing structures. However, in lieu of producing the ribs or corresponding chord members in any of the various forms which are now utilized, I shape them from corrugated metal, preferably of the same gauge as that used for the web portions of the spars. These ribs, indicated at 12, which are shaped to obtain the desired airfoil curvature, are relatively narrow with their corrugations disposed longitudinally, and surround the front and rear spars which are, of course, set in the correct laterally-spaced relationship for the chord of the wing. As is clearly shown in Figure 1 of the drawings, the vertical spacing of the top and bottom defining portions of a rib section is such, that the inner surfaces of these portions will abut upon the respective sets or pairs of the top and bottom flanges 10 and 11 of each of the spars, when the ribs are associated therewith, to provide for the formation of the nose of the wing and the trailing surface thereof. Obviously, the hills and valleys of the corrugations of the ribs 12 will register with alined hills and valleys of the supporting flanges of the respective spars, so that the ribs may be readily set or located at their assigned stations in the frame-work structure and temporarily or permanently secured to the spar flanges, as hereinafter explained.

Fore and aft bracing of the framework may be effected in any suitable manner, but I preferably employ strips of corrugated material 14, as shown in Figure 1, their corrugations, similarly to those of the ribs 12, registering with the complemental surfaces of the top and bottom pairs or flanges of the front and rear spars. In the arrangement shown, certain of said bracing members 14 are connectible to the two bottom flanges 11 of the front spar and the top flanges 10 of the rear spar, with the alternate members inclined from the top flanges of the front spar to the bottom flanges of the rear spar. If desired, these fore and aft bracing members may be located within the ribs, in which event their attaching portions may be interposed between the supporting flanges of the spars and the abutting surfaces of the ribs, with the hills and valleys of the alined corrugations of the three layers of material in registration, for the purpose which will hereinafter become apparent.

In the assembly of the wing framework the spars, ribs, and bracing members which previously may have been provided with suitable rivet-receiving apertures, as at 13, may be associated with their apertures in alinement, and temporarily held in position by bolting, or other means, or they may be permanently fastened together by the use of hollow or other rivets, preferably the former, pending the placement of the covering or sheathing thereupon.

The skin or covering of the wing, which, as shown, is also of corrugated metal, of the same or a lighter gauge than that which constitutes the web members 8 of the spars, is now applied, a preferably uninterrupted center section 16, as a sheet, spanning the front and rear spars, with the surfaces defining its transversely disposed corrugations mating with those of the framework members upon which it bears. As will be seen, in the construction shown in Figure 1, corrugations of the center section 16 of the skin, are in registration with the corrugations of the ribs at the stations of the latter, while intermediate thereof, they mate with those of the bracing members and of the adjacent flanges of each of the two spars. Thus, each sheet employed in the formation of the center section of the sheathing is positively supported along and inwardly of its two longitudinal edges, either directly or indirectly by the spaced flanges of each spar, throughout the area of surface contact between the supporting and the supported elements of the wing structure. In carrying the center section through the span, a multiplicity of sheets may be riveted together in the customary manner, as they are applied or at any other suitable period of the assembly operation, each of the sheets, however, being provided with rivet-receiving holes 17 which are alined with the previously registered apertures of the spar flanges and the associated ribs and bracing members. As in the handling of the ribs and bracing members, the location of the center sections of the skin is greatly expedited by the cooperation of the corrugations thereof with those of the supporting elements of the wing framework, the same being true with respect to the placement of the nose-forming sections 18 of the wing and those which complete the trailing or rear sections 19, thereof. Preferably, in the cutting and shaping of the sheets for the formation of these sections 18 and 19, provision is made for an overlapping jointure with the center section forming sheets 16, as indicated at 20, the nose-forming sheeting being superposed upon the center-section sheeting, at the top and bottom of the wing, while the trailing edge-forming section sheets may underlie the sheets of the center-forming section. Of course, this lapping arrangement may be varied to suit different structural or other requirements, it being desirable, however, irrespective of the direction or disposition of the lap, that the nose and trailing edge-forming sheets span the two top flanges 10 and both bottom flanges 11 of the cooperating and adjacent spar. Similarly, to the center section sheets, those of the nose and trailing edge of the wing are perforated at proper intervals to register with the apertures of the wing components upon which they may be superposed, so that when the assembly of the frame constituents is completed and the skin sections 16, 18, and 19 are associated therewith, as described, in superimposed and corrugation-mating relationship (see Fig. 5), a permanent jointure thereof may be effected by riveting the superimposed layers of metal together, as shown in Figure 6. As will be apparent, the riveting operation is greatly simplified by the alinement of the rivet-receiving holes of the several cooperating elements of the wing structure, these apertures being preferably located in the valleys of the corrugations at proper intervals, or they may, of course, be formed in the hills or in both the hills and valleys of the corrugations, depending upon construction and other conditions. A single rivet, as indicated at 21, in each instance, serves to tie or clamp all of the superimposed portions of the several components of the wing structure in the prescribed cooperating relationship, the rivets being arranged in two rows, parallel or staggered, along the opposite flanges at the top and bottom of each spar. The sequence of the assembly operations and the relative disposition of the frame elements and skin-forming sections of the wing will be readily understood by reference to Figure 4 of the drawings, in which the securing rivets 21 are poised for insertion in the alined orifices of the several parts.

From the foregoing, it will be seen that the center section 16 of the skin or sheathing contributes materially to the strength of the wing as a whole. It not only supplements the functioning of the chord members 12 and 14, as fore and aft bracing, but due to its disposition upon the spars and the large effective area of each sheet composing the center section, greater stability is afforded to the entire structure, in resisting detrimental forces, especially the destructive torsional strains within the spars. However, in addition to the increased strength that is directly contributed by the center section of the skin, the spar construction, in itself, is an important factor in the wing assembly. The longitudinals of rectangular cross section, supported by the corrugated sheets with their integral reinforcing flanges forming the top and bottom supporting surfaces of the spars provide a unit that may be fabricated of light gauge metal and one that is inherently stronger than a spar of existing standards of construction, of the same dimensions and weight. This will, at once, be evident from the fact that the lines along which the most disruptive forces are transmitted, are those wherein the resistance is the maximum obtainable in the assembly.

Thus, with the spar that I utilize, and the manner in which I employ the center section of the skin as a contributing element to the strength and rigidity of the structure, as a whole, I am enabled to construct an airfoil or other so-called sustaining surface of a given load capacity which will be of a lighter weight than a corresponding wing of existing structural design, the skin, as applied, taking bending stresses as well as those of torsion and drag, it, of course, being obvious, that the lapping and double riveting of the skin sections upon the spars impart to the latter a greater moment of inertia and also are effective in obtaining a substantially equal distribution upon the spars of the loads that are direct products of high and low incidence. This highly desirable result, as well known, is impossible of attainment with existing designs, approximately the entire load of high incidence being transmitted to the rear spar, while at low incidence it is borne by the front spar, which makes it essential that the spars be sufficiently heavy to withstand these unequal load shifts, or, a condition that may be more accurately termed overloading.

In effect, what is obtained by my construction, is a wing having a girder-like center section, the spars corresponding to the flanges of a girder, while the sheathing along the center of the top and bottom of the wing is the equivalent of its web portions, the diagonals or other chord members when used functioning as the internal bracing members of the girder. Manifestly, with such a construction, every element thereof is constantly making a direct and substantial contribution to the strength and rigidity of the strucure as a whole with the natural result that material of lighter weight may be utilized throughout, than under present methods of construction, without entailing any reduction in the strength required in a wing of a given load capacity.

In Figure 11, I have illustrated a modified type of spar-forming unit, in which the corrugations 24 of the web-portions are diagonally disposed, while in the embodiment of my invention shown in Figure 9, in lieu of the tubular longitudinals 7, I employ channel members 25, two of which, with their web portions opposed are used as an equivalent of one of the longitudinals 7. This specific construction may be found to possess certain advantages in meeting different structural requirements in the various fields wherein my invention may be applied, as in vehicle body building and in the erection of portable houses for many purposes, as well as permanent structures, its use, of course, being alternative to the preferred form of my invention, in any of the applications, wherein its employment is feasible. The same is true with respect to the formed up corrugated type of longitudinal, shown in Figure 10, in which the corrugations 26 are disposed transversely of the axis of said member, the parallel sides of the channel being folded inwardly, as at 27, for reinforcing the edges.

Figure 12, illustrates an alternative method of affixing a chord member to a laterally projecting flange of the spar, the spar-cooperating portion of said member being curved to conform to the inside of the flange as at 28, the surface 29 therebeyond abutting upon the web of the spar, in the zone of its attachment to the longitudinal 7, to which it may be riveted through said web portion.

While I have described my invention more or less specifically as employed in the production of an airplane wing and analogous sustaining surfaces, it will be apparent from the disclosure that it is susceptible to a wide range of application, as hereinbefore stated, the structural unit, which, in the airplane wing structure, is utilized as a spar, being capable of use in a corresponding horizontal position, or with its longitudinal axis in a vertical plane, in producing many forms of structures, it also being evident that the girder-like construction obtained by utilizing sheathing material, in conjunction with said unit, as described, may be advantageously followed in the production of motor vehicle bodies, marine craft of many types and in the fabrication of lighter-than-air craft including their control cabins and power plant gondolas, as well as for divers other purposes, by the use of the materials and in the manner set forth, or by the employment of equivalent materials and corresponding methods of effecting their cooperation for attaining the objectives to which my invention is directed.

I claim:

1. An airplane wing constructed of metal, embodying front and rear spars, each having parallel longitudinal members of a rectangular cross section connected by corrugated web-forming members, said web-forming members being shaped to provide laterally projecting flanges constituting their longitudinal edges and forming jointure making surfaces, chord members associated with said surfaces, center forming skin sections spanning said spars in superimposed engagement with said chord members and common means for uniting said center forming sections and said chord members to the jointure making surfaces of said spars, to produce a girder-like structure of which the center-forming skin sections constitute the web and the spars and chord members the longitudinals and internal bracing respectively.

2. A sustaining surface, embodying frame members, each being fabricated of metal with longtiudinals of rectangular cross section and web portions of corrugated sheeting riveted to the longitudinals, the web portions being shaped to provide laterally projecting flanges constituting their longitudinal edges, spacing elements connecting said members in a predetermined correlationship and a covering for said frame members and connecting elements, said covering including sections spanning said frame members, and means for effecting a permanent jointure between said spanning sections and the laterally projecting flanges of said frame members upon which they abut.

3. A structural unit having longitudinals of a rectangular cross section formed of corrugated metal, the corrugations being disposed transversely thereof, and corrugated web-forming sheets fixed to said longitudinals in parallel, the lines of the corrugations of each web portion intersecting the longitudinal axis thereof, said web-portions having integral laterally projecting flanges constituting jointure-making surfaces in juxtaposition to the longitudinals of the unit.

SALO CYRUS FINGER.